United States Patent [19]
Powell

[11] Patent Number: 5,261,977
[45] Date of Patent: Nov. 16, 1993

[54] METHOD OF FABRICATION FREE-STANDING THIN FILMS OF POLYIMIDE

[76] Inventor: Stephen F. Powell, 730 Southview Way, Woodside, Calif. 94062

[21] Appl. No.: 976,534

[22] Filed: Nov. 16, 1992

Related U.S. Application Data

[63] Continuation-in-part of Ser. No. 738,865, Aug. 1, 1991, abandoned.

[51] Int. Cl.$^5$ .............................................. B32B 31/16
[52] U.S. Cl. ...................... 156/74; 156/150; 156/234; 156/246; 156/268; 156/280; 264/259; 264/311; 427/240; 427/250
[58] Field of Search ................ 156/74, 246, 150, 268, 156/234, 280; 264/259, 311; 427/240, 250

[56] References Cited

U.S. PATENT DOCUMENTS

| | | |
|---|---|---|
| 2,631,334 | 12/1947 | Bailey . |
| 4,155,793 | 5/1979 | Salemme . |
| 4,246,054 | 1/1981 | Nester ................................. 156/74 |
| 4,364,792 | 12/1982 | Gliem et al. ........................ 427/250 |
| 4,374,891 | 2/1983 | Ward . |
| 4,393,113 | 7/1983 | Sugie . |
| 4,536,240 | 8/1985 | Winn .................................. 264/311 |
| 4,746,474 | 4/1988 | Kohn . |
| 4,880,699 | 11/1989 | Kohn . |
| 4,929,405 | 4/1990 | Kohn . |

OTHER PUBLICATIONS

A. G. Michette, *Optical Systems for Soft X-rays*, Plenum Publishing Corporation, p. 261 (1986).
M. Heppener and D. G. Simons, "A Large Aperature Imaging Gas Scintillation Proportional Counter", in *X-ray Instrumentation in Astronomy II*, Proc. SPIE, vol. 982, pp. 139–146 (1988).
U. G. Briel, E. Pfeffermann, G. Hartner, and G. Hasinger, "X-ray Calibration of the ROSAT Position Sensitive Proportional Counter", in *X-ray Instrumentation in Astronomy II*, Proc. SPIE, vol. 982, pp. 401–408 (1988).
R. T. Perkins, D. D. Allred, L. V. Knight, and J. M. Thorne, "Design of High Performance Soft X-ray Windows", in *X-ray/EUV Optics for Astronomy and Microscopy*, Proc. SPIE, vol. 1160, pp. 56–61 (1989).
A. Smith, *Newsletter of the Astrophysics Division*, No. 9, p. 3 (Aug., 1989).

(List continued on next page.)

*Primary Examiner*—John J. Gallagher

[57] ABSTRACT

A method of fabricating free-standing thin films of polyimide by casting a polyamic acid solution onto a substrate that is free of parting agents and release agents is disclosed. The polyamic acid film is imidized on the substrate. The thickness of the polyimide film can range from about 200 Å to about five microns. A frame is adhered to the polyimide film while the film still attached to the substrate, and the frame, film, and substrate assembly is immersed in an aqueous based liquid bath for several hours wherein the liquid bath is free of reactive chemical agents. The liquid bath is heated, preferably, to a temperature within the range 30° to 100° C. The liquid is prevented from contacting the polyimide film within the interior region of the frame. Next, the assembly is removed from the water bath. The film is scored around the outside edge of the frame with a cutting tool; this cutting step may be performed either prior to, during, or after the immersion step. The frame is then detached from the substrate by first lifting only one side of the frame and then pivoting on the edge 180 degrees opposite. The process uses the frame itself to peel the film off the substrate, thereby producing a frame-supported and free-standing polyimide film. The present method omits the use of chemical agents, release agents, parting agents, and other detachment means whose purpose would have been to loosen the bond between the film and the substrate. The polyimide film may be metallized by vacuum evaporation or by sputtering to create a metal-polyimide composite. Free-standing thin polyimide films find particular utility in x-ray optics as bandpass filters and proportional counter entrance windows.

20 Claims, 3 Drawing Sheets

OTHER PUBLICATIONS

S. Nenonen, H. Sipila, P. Jalas, and R. Mutikainen, "Soft X-ray Windows for Position Sensitive Proportional Counters", in *EUV, X-ray, and Gamma-ray Instrumentation for Astronomy*, vol. 1344, pp. 100–105 (1990).

A. B. C. Walker, J. F. Lindblom, R. H. O'Neal, M. J. Allen, T. W. Barbee, and R. B. Hoover, "Multi-Spectral Solar Telescope Array", *Optical Engineering*, vol. 29, No. 6, pp. 581–591 (1990).

F. R. Powell, P. W. Vedder, J. F. Lindblom, and S. F. Powell, "Thin Film Filter Performance for Extreme Ultraviolet and X-ray Applications", *Optical Engineering*, vol. 29, No. 6, pp. 614–624 (1990).

E. Spiller, K. Grebe, and L. Golub, "Filters for Soft X-Ray Solar Telescopes", *Optical Engineering*, vol. 29, No. 6, pp. 625–631 (1990).

R. B. Seymour and C. E. Carraher, *Polymer Chemistry*, Marcel Dekker, Inc., Publishers, p. 451 (1981).

W. R. Hunter, "The Preparation and Use of Unbacked Metal Films as Filters in the Extreme Ultraviolet", *Physics of Thin Films*, vol. 7, pp. 74–77 (1973).

P. Maier-Komor, "Large Area Polyimide Foils for Heavy Ion Gas Detector Systems", *Nuclear Instruments and Methods in Physics Research*, A282, pp. 172–175 (1989).

METHOD OF FABRICATION FREE-STANDING THIN FILMS OF POLYIMIDE

CROSS-REFERENCE TO RELATED APPLICATIONS

This application is a continuation-in-part of Ser. No. 07/738,865, filed Aug. 1, 1991, now abandoned.

BACKGROUND

1. Field of the Invention

This invention relates to methods of fabricating free-standing, frame-supported thin polymeric films.

2. Prior Art

Thin films of polymeric materials are used extensively in extreme ultraviolet (EUV) and x-ray optics. Some of the current and potential applications of thin polymeric films include bandpass filters and proportional counter entrance windows, two common elements of x-ray instrumentation.

By way of example, proportional counters are one type of detection device used in soft x-ray astronomy and microscopy. The entrance window of a gas scintillation type of proportional counter isolates the chamber housing the scintillation gas from the counter's surrounding environment. The scintillation gas, often xenon or a mixture of argon and methane, is maintained at atmospheric pressure. X-rays travel from the object under observation through the window and into the bulk of the scintillation gas. Events in the scintillation gas "count" the number of incoming photons.

Proportional counter windows have both optical and mechanical requirements to satisfy. The degree to which x-rays are attenuated by the window is an important factor to be considered in the design of the counter. The materials comprising the entrance window absorb x-rays according to the relation:

$$T = e^{-\alpha x},$$

where T is the optical transmission of the film (a percentage, and therefore dimensionless), $\alpha$ is the linear absorption coefficient of the film material (in $cm^{-1}$), and x is the film thickness (in cm). Because transmission depends inversely and exponentially on film thickness, absorption by the entrance window can be minimized by using the thinnest possible film that satisfies mechanical requirements. Absorption can also be minimized by choosing materials low in atomic number, such as carbon.

Proportional counters in x-ray astronomy must be utilized aboard orbiting spacecraft since x-rays are not transmitted by the earth's atmosphere. In this application the window must survive the vibrations accompanying launch of the spacecraft, and the pressure differential of one atmosphere generated by the vacuum of space. Typical windows "leak" gas. The scintillation gas can pass through pinholes in the film, and can diffuse directly through the bulk of the material itself. Gas leaks require the counter to be replenished by an exterior supply to compensate for the mass of gas which is lost to space.

The entrance window must be electrically conducting. This can be accomplished by mounting the window to a wire mesh, which serves as a mechanical support as well as an electrical conductor, or by metallizing the surface of the polymeric film using standard deposition techniques such as vacuum evaporation and sputtering.

To date, the materials most capable of fulfilling the optical and mechanical requirements of proportional counter entrance windows include polypropylene, polycarbonate, Formvar (TM), and elemental carbon. Chemically Formvar is poly(vinyl formal), and is sold by (among others) the Monsanto Company. Some investigators design filters composed of a single layer of material, using only one of these materials at a time, whereas others assemble composite structures with two or more layers of these materials in the same filter.

The use of a mesh supported, 1,000 Å thick film of carbon as the entrance window for an x-ray microscope's proportional counter is discussed in *Optical Systems for Soft X-Rays* by A. G. Michette, p. 261, Plenum Publishing Corporation (1986). A 3.3 micron polypropylene entrance window, coated with colloidal carbon to provide electrical conductivity, is disclosed by M. Heppener and D. G. Simons in an article entitled "A Large Aperture Imaging Gas Scintillation Proportional Counter" in *X-Ray Instrumentation in Astronomy II*, Proc. SPIE, Vol. 982, pp. 139–146 (1988). A composite entrance window comprising a one micron polypropylene foil coated with carbon and Lexan (TM) is discussed in an article entitled "X-Ray Calibration of the ROSAT Position Sensitive Proportional Counter" by U. G. Briel, E. Pfeffermann, G. Hartner, and G. Hasinger in *X-Ray Instrumentation in Astronomy II*, Proc. SPIE, Vol. 982, pp. 401–408 (1988). Lexan is a form of polycarbonate which is owned by the General Electric Company.

In an article entitled "Design of High Performance Soft X-Ray Windows" in *X-Ray/EUV Optics for Astronomy and Microscopy*, Proc. SPIE, Vol. 1160, pp. 56–61 (1989), R. T. Perkins, D. D. Allred, L. V. Knight and J. M. Thorne teach that compound window materials containing a mixture of carbon, nitrogen, and oxygen would be superior to polypropylene, which contains essentially only carbon, because "single element windows are 'colored' in that they transmit certain wavelengths better than others." A window with equal mixtures of carbon, nitrogen and oxygen would "transmit the wavelengths which correspond to each element roughly equivalently." Perkins et al. submit that "such windows would be approximately neutral density for elemental soft x-rays . . . , that such 'gray windows' would be a noteworthy achievement . . . ," and suggest that " . . . one of the families of materials which contain carbon, nitrogen, and oxygen are the polyimides."

In the European Space Agency's *Newsletter of the Astrophysics Division*, No. 9, p. 3, (August, 1989), A. Smith discusses the use of a one micron polypropylene foil coated with Lexan to serve as an entrance window on the low energy gas scintillation proportional counter (LEGSPC) of the Italian Space Agency's X-Ray Astronomy Satellite (SAX). Smith also discloses an "alternative in the form of a polyimide foil," which should be "more robust, less leaky, and able to withstand much higher temperatures than polypropylene." Additionally, the "need for a gas supply system for the detector would be obviated."

In their article entitled "Soft X-Ray Windows for Position Sensitive Proportional Counters" in *EUV, X-Ray and Gamma-Ray Instrumentation for Astronomy*, Proc. SPIE, Vol. 1344, pp. 100–105 (1990), S. Nenonen, H. Sipila, P. Jalas and R. Mutikainen outline the development of polyimide windows 0.5 to 2.5 microns thick for the Soviet Spectrum-X-Gamma satellite. The polyimide was coated with aluminium to reduce gas permeation and the transmission of visible and infrared light.

By way of a second example of the role thin polymeric films play in x-ray optics, bandpass filters are routinely enlisted in EUV and x-ray astronomy to isolate a specific energy band. X-ray telescopes have been directed at the sun, for example, to study the distribution of the Fe IX and Fe X ions that emit between 171 and 175 Å in the x-ray region of the spectrum, as described by A. B. C. Walker, J. F. Lindblom, R. H. O'-Neal, M. J. Allen, T. W. Barbee, and R. B. Hoover in "Multi-Spectral Solar Telescope Array," *Optical Engineering*, Vol. 29, No. 6, pp. 581-591 (1990). Elemental carbon and carbon containing polymeric films are especially useful for blocking unwanted EUV radiation longer than 400 Å in wavelength. Polymeric films are frequently coated with metals that serve to further define the bandpass of interest. Aluminium is a particular favorite for rejecting the visible light in solar radiation that occurs at $10^{10}$ times the energy in the x-ray region of the spectrum. If not eliminated, the visible light "bleaches," or overexposes the photographic film recording the x-ray image.

In addition to their role as filter materials, polymeric films can serve as a substrate on which to deposit the metallic layers. If this is the case, particulate contamination in the polymeric film is disasterous since it leads to the formation of pinholes which leak visible light. Particles interfere with the condensation and subsequent subsurface diffusion of metal atoms necessary for uniform growth of the metal film. The particles can also act as stress concentrators in films, eventually leading to the opening up of pinholes as a result of stress relaxation.

The use of the carbon containing compounds Lexan, phthalocyanine, and Parylene N (TM) in bandpass filters is discussed in an article entitled "Thin Film Filter Performance for Extreme Ultraviolet and X-Ray Applications" by F. R. Powell, P. W. Vedder, J. F. Lindblom and S. F. Powell in *Optical Engineering*, Vol. 29, No. 6, pp. 614-624 (1990). Chemically Parylene N is poly(p-xylylene), which is owned by the Union Carbide Corporation. E. Spiller, K. Grebe, and L. Golub report work relating to polypropylene/carbon composite filters in "Filters for Soft X-Ray Solar Telescopes," *Optical Engineering*, Vol. 29, No. 6, pp. 625-631 (1990).

Polyimides have not been discussed in the literature pertaining to bandpass filters. The mechanical properties of polyimides relative to polypropylene and polycarbonate, however, has been well covered in the prior art. The strength of these polymers when processed by injection molding has been reviewed by R. B. Seymour and C. E. Carraher in their book *Polymer Chemistry*, published by Marcel Dekker, Inc., p. 451 (1981):

|  | Tensile Strength (kg/cm$^2$) | Flexural Strength (kg/cm$^2$) |
| --- | --- | --- |
| polypropylene | 343 | 490 |
| polycarbonate | 630 | 945 |
| polyimide | 1190 | 1100 |

The table suggests that for films of equivalent strength, a polyimide filter could be constructed thinner than one of either polypropylene or polycarbonate, and, therefore, the polyimide filter would transmit more of the radiation impinging thereon. The temperature stability of polyimides relative to polypropylene and polycarbonate, furthermore, indicates that polyimide films could be more easily metallized in high temperature deposition processes such as vacuum evaporation and sputtering.

In summary, there is a need within the field of x-ray optics for free-standing, thin films of polyimide. The films must be flat and contain no pinholes. Because the extent to which energy is absorbed by the filter depends critically on thickness, a feasible fabrication process must be capable of controlling film thickness to within ±10 percent of the nominal value, or 100 Å, whichever is the lessor of the two.

Heretofore, free-standing thin polyimide films have been fabricated by a number of methods, including: 1) casting a polyamic acid film onto the surface of a liquid bath, allowing the solvent to evaporate thus solidifying the film, and then recovering the film from the surface of the bath, 2) depositing a release agent onto a solid substrate, casting a polyamic acid film onto the substrate, and then floating the film off onto the surface of a liquid bath by dissolving away the release agent from beneath the film, 3) adhering a frame to a polyimide film while the film is still attached to the substrate onto which it was deposited, immersing all or a portion of the film, frame, and substrate assembly in a reactive chemical solution such as concentrated hydrofluoric acid to loosen the bond between the film and the substrate, and then removing the frame-supported film from the substrate, 4) depositing a release agent onto a solid substrate before the deposition of a polyimide film, adhering a frame to the film, and then removing the frame-supported film from the substrate by dissolving away the release agent from beneath the film, and 5) first removing a polyimide film from the substrate onto which it was initially deposited, said removal step being performed by air jets, liquid jets, or some other detachment means, and then attaching a frame to that free-standing film.

In U.S. Pat. No. 4,929,405 (issued May 29, 1990), R. S. Kohn fabricated a free-standing polyimide film by the first of those methods, and disclosed a process in which an ultrathin film was recovered by lifting the film from the surface of a liquid bath with the use of a 2" by 3" aluminium plate having a 3 cm diameter hole at its center. A difficulty inherent with this method is that the surface of the liquid bath must not be vibrated or the nascent thin film will be damaged. Another difficulty inherent with this method is that the surface of the liquid bath can, potentially, accumulate particulate contamination with the possibility of causing further damage to the nascent polymer film. Yet another difficulty with this method is that the final film thickness can be regulated only by adjusting the concentration of solids in the casting solution, since the film thickness is influenced by the extent to which the polyamic acid solution spreads out over the surface of the liquid bath. Still another difficulty with the method of U.S. Pat. No. 4,929,405 is that the "thermal treatment rendering the film insoluable in its casting solvent," i.e., the imidization step, is performed after the film has been attached to the aluminium plate, subjecting the film to a biaxial stress state as a result of the mismatch between the thermal expansion coefficients of the polyimide and the aluminium, respectively. Finally, the end uses of the polyimide films disclosed by Kohn that were 400 Å or less in thickness involved the controlled release of drugs and the separation of gases, and did not include applications to x-ray optics for which thicknesses in the range 200 Å to five microns would be useful.

In U.S. Pat. No. 2,631,334, J. S. Bailey teaches that a thin film can be recovered from the surface of a liquid bath with an adherent frame, but the fabrication process again involved casting the polymeric precursor solution onto the surface of a liquid bath, and the films that Bailey disclosed were made of nylon and not polyimide.

In U.S. Pat. No. 4,393,113 (issued Jul. 12, 1983), K. Sugie, T. Yamada, and T. Yamaji published a process for fabricating an ultrathin silicon containing copolymer membrane, but again the method involved casting the polymeric precursor solution onto the surface of a liquid bath. In this technique the film was recovered by a porous sheet-like material. The utility was concerned with the separation of gases.

In U.S. Pat. No. 4,374,891 (issued Feb. 22, 1983), W. J. Ward, III, specified a process for fabricating ultrathin films of a polyphenylene oxide/organopolysiloxane-polycarbonate copolymers, but again the method involved casting the polymeric precursor solution onto the surface of a liquid bath. Removal of the film from the surface of the casting substrate was accomplished by the use of a vacuum pickup on a microporous substrate. The applications of these films were stated to be gas separation devices.

In U.S. Pat. No. 4,155,793 (issued May 22, 1979), R. M. Salemme and W. R. Browall described the fabrication of ultrathin films of polymers using a continuous process, in which a flexible microporous support layer was fed into a liquid bath on whose surface resided the ultrathin polymer film. Again, the method for preparing the ultrathin film involved casting the polymeric precursor solution onto the surface of a liquid substrate.

A method in which metal films are floated off their substrate of deposition is discussed in an article entitled "The Preparation and Use of Unbacked Metal Films as Filters in the Extreme Ultraviolet," by W. R. Hunter, in *Physics of Thin Films*, Vol. 7, pp. 74-77 (1973). A release agent was deposited onto the substrate before the metal film was coated. The substrate was subsequently immersed in a liquid which served to dissolve the release agent beneath the metal film. This allowed the film to float off the substrate onto the surface of the liquid bath. The film was then recovered onto a frame. A similar floating technique was used to produce free-standing films of polyimide by P. Maier-Komor and was described in "Large Area Polyimide Foils for Heavy Ion Gas Detector Systems," *Nuclear Instruments and Methods in Physics Research*, A282, pp. 172-175 (1989).

A method in which a frame (or "carrier element") is attached to a polymer film before the film is released from the substrate onto which it was deposited is disclosed by J. F. Nester in U.S. Pat. No. 4,246,054 (issued Jan. 20, 1981). After the frame is attached to the film in Nester's technique, the edges of the frame, film, and substrate assembly are immersed in a chemical solution designed to react with and loosen the bond between the film and the substrate. An example of an appropriate chemical solution described by Nester is concentrated hydrofluoric acid. The entire assembly is then, in a separate step, immersed completely in water to cause the substrate to fall away from the frame-supported film. It should be noted that the edges of the film, frame, and substrate assembly in Nester's method are immersed in the reactive chemical solution prior to insertion of the assembly in the water bath, and that immersion in the reactive chemical solution represents a distinct and separate step from that of immersion in the water bath. An obvious difficulty with this method is that exposing the thin polymer film to a harsh chemical substance such as concentrated hydrofluoric acid has the potential to damage the film. Additionally, the manner in which the film, frame, and substrate assembly is immersed completely in water in the second, water bath immersion step necessarily exposes the film that is destined to become the final product to contaminants in the water bath. The utility of Nester's free-standing polymer membranes relates to x-ray lithography masks.

In U.S. Pat. No. 4,536,240 (issued Aug. 20, 1985), R. Winn also discloses a method for making frame-supported, free-standing membranes by means of attaching an adherent frame to the film before the film is released from the substrate (or "forming surface"), but only in the case when a parting or release agent has been used. In this embodiment a parting or release agent is applied to the substrate before the polymer film is deposited. The release agent is dissolved away from beneath the film to cause the frame-mounted film to separate from the substrate. A difficulty inherent with this method is that a release agent can damage and/or contaminate the polymeric film. Winn describes a second technique in which the film is first removed from the substrate by air jets, liquid jets, or other detachment means, and the film is attached to a frame in a subsequent step. An obvious difficulty with this technique is that detachment means such as air jets and liquid jets have the potential to cause damage to a thin polymeric film. Winn's membranes were stated to have optical applications.

In summary, the prior art teaches that the bond between a polyimide film and the substrate onto which it was deposited has an adhesive strength large enough to cause difficulties when fabricating a free-standing version of the film. One method of fabricating free-standing films involves avoiding a solid substrate of deposition entirely, as in the case when a film is cast onto the surface of a liquid bath. When a solid substrate is used, the prior art teaches that chemical solutions, parting agents, release agents, air jets, mechanical jets, and other similar detachment means must be employed to cause separation of the film from the substrate.

OBJECTS AND ADVANTAGES

It is an object of this invention, therefore, to fabricate free-standing thin polyimide films in thicknesses ranging from 200 Å to five microns by a method other than casting or floating the polyimide film onto the surface of a liquid bath. Additionally, it is the object of this invention to employ a method in which: 1) the substrate onto which the film is initially deposited is free of release agents and parting agents, 2) an adherent frame is attached to the film before the film is released from the substrate, and 3) the film is then released from the substrate after immersion in a water bath wherein there has been no prior exposure of the assembly to a reactive chemical solution whose function would have been to loosen the bond between the film and the substrate. The polyimide films may be metallized by either vacuum evaporation or by sputtering. The metallization may be performed either before or after the release step.

Unlike the method wherein the polyimide film is cast onto the surface of a liquid bath, the objects and advantages of the present method are:

1. that with casting techniques such as spincoating the film thickness can be precisely controlled by adjusting the concentration of the polyamic acid in its solvent, and by regulating the rotational speed of the spincoater, 2. that the liquid casting bath whose vibrations can ripple or damage the nascent film has been eliminated, 3. that the liquid casting bath which can act as a source of particulate contamination has been eliminated, 4. that the polyimide film in the spincoating method is exposed only to the surface of a virgin, uncoated, clean room prepared silicon wafer, or some other similar such substrate, hence reducing the possibility of contamination and mechanical stresses that lead to the formation of pinholes, 5. that the spincoating method for producing a film is faster than that of dispensing onto the surface of a liquid bath.

The techniques described in the prior art wherein a frame is adhered to the film while the film is still attached to the substrate are limited in that detachment means with the potential to damage the polymer film have been used to cause the film to separate from the substrate. The objects and advantages of the present method with regard to these techniques are:

6. that detachment means with the potential to damage the film, such as reactive chemical solutions, parting agents, release agents, air jets, liquid jets, and/or similar detachment means have been omitted from the present procedure, and 7. that the frame itself is used in the present invention to affect the release of the film from the frame, thereby simplifying and improving the process.

SUMMARY OF THE INVENTION

In accordance with the present invention, a polyamic acid solution is cast onto the surface of a silicon wafer or other appropriate substrate that is free of release agents and parting agents. The solvent is evaporated and the polyamic acid film is imidized. The thickness of the resulting polyimide film can range from about 200 Å to about five microns. An adherent frame is attached to the polyimide film, and the entire wafer, film and frame assembly is immersed in an aqueous based liquid bath for several hours wherein the liquid bath is free of reactive chemical agents. The liquid bath is heated preferably to a temperature within the range 30° to 100° C. The liquid from the bath is prevented from contacting the polyimide film within the interior region of the frame. Next, the assembly is removed from the water bath. The film is scored around the outside edge of the frame with a cutting tool; this cutting step may be performed either prior to, during, or after the immersion step. The frame is then detached from the wafer by first lifting only one side of the frame and then pivoting on the edge 180 degrees opposite. The process uses the frame itself to peel the film off the substrate, thereby producing a frame-supported and free-standing film of polyimide. A metal-polyimide composite may be created by evaporating or sputtering a metal film onto the polyimide film either before or after the polyimide film is released from the substrate onto which it had been deposited.

REFERENCE NUMERALS IN DRAWINGS

Figure 1:
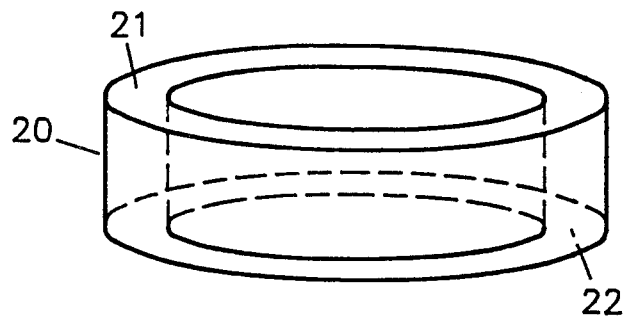
FIG. 1 shows a typical frame used to release a polyimide film from a substrate onto which it had been deposited.

20: Outside surface of a release frame.

21: Edge of a release frame onto which an adhesive is applied.

22: Edge of a release frame over which it is preferable that a liquid be prevented from flowing during immersion in an aqueous based liquid bath; otherwise, the liquid will contact and contaminate a surface of the film contained within the interior region of the frame.

23: Silicon wafer.

24: A region of polyimide film located outside a release frame.

25: A region of polyimide film located inside a release frame.

26: An outside edge of a frame around which an appropriate cutting tool is used to score a film either before, during, or after immersion in a liquid bath.

27: An adhesive which holds a frame to a polyimide film.

28: A surface of a liquid bath.

29: Final frame, or field application frame.

30: Edge of a final frame around which a polyimide film is cut with an appropriate tool during a "transfer" step.

31: Second frame used for "sandwiching" a polyimide film between two different frames.

DESCRIPTION OF THE INVENTION

Polymer films are commonly prepared by drawing a substrate through a solution of the polymer in an appropriate solvent. Lexan films, for example, can be cast from a solution of the polycarbonate polymer in dichloromethane solvent. Although a polycarbonate such as Lexan can achieve very high molecular weights, this drawing process is nevertheless feasible because polycarbonate is a linear polymer, and thus can be dissolved. In contrast to the polycarbonates, polyimides are insoluble and must be processed as "B-staged" polymers. The method of spincoating a polyimide film on a semiconducting substrate to create a dielectric layer is well known in the microelectronics industry.

The polyimide precursors that are commercially available are synthesized by the condensation of a diamine and a dianhydride. An example is the polymerization of p-aminoaniline (the diamine) and pyromellitic dianhydride in a dipolar aprotic solvent such as N- methyl-2-pyrrolidone (NMP), which forms a high molecular weight polyamic acid:

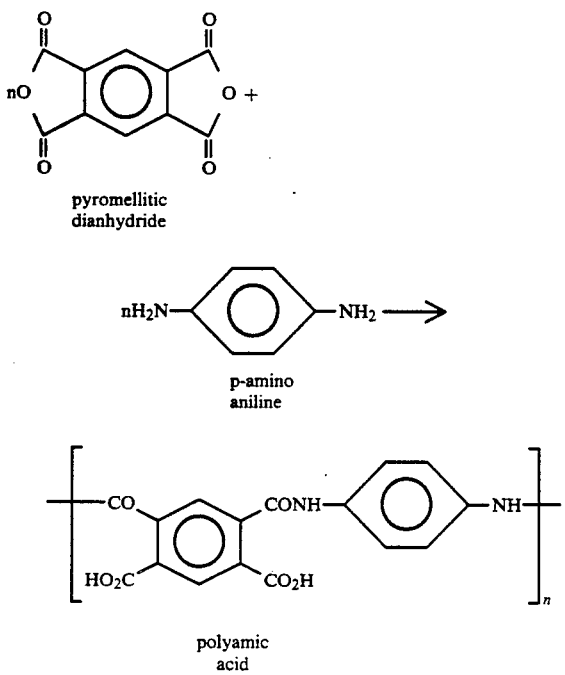

The polyamic acid is usually marketed as a solution of 15 to 20% solids in NMP, but can be diluted further, as necessary, to produce the desired viscosity for spin coating.

After the polyamic acid film is cast from solution, further processing requires two stages: 1) a "soft-bake" at about 100° C. to remove the solvent from the film, and 2) a "hard-bake" at about 300° C., during which the polyamic acid is cyclized in the solid state to the polyimide. This latter stage is referred to as "imidization." The ring closure of the second stage involves the removal of water:

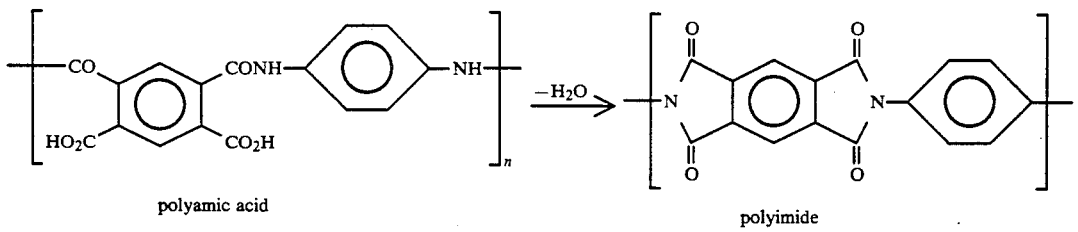

The familiar material Kapton (TM by DuPont de Nemours E.I., & Co.) is synthesized according to this scheme, although the diamine employed is p,p'-diaminodiphenylether (also known as oxy-dianiline).

In the present invention, a solution of polyamic acid is loaded into a syringe that has a microfilter attached to its tip. The polyamic acid solution is dispensed onto a virgin silicon wafer (or glass, quartz, or similar such substrate) that is free of release agents and parting agents. In this context, the word "virgin" is being used to describe a wafer that is free of any contamination, impurity, or coating, but the wafer does not necessarily have to be new (the substrate could, for example, have been recycled or reclaimed). The polyamic acid solution is dispensed as the substrate is rotating on the spincoater at a low spin rate, such as 500 revolutions per minute. The spin speed of the coater is increased to the final, high spin rate, which spreads the solution radially outwards towards the edges of the wafer. The second, high spin speed determines the final thickness of the film.

The wafer is then removed from the spincoater, and the solvent evaporated from the film by heating the wafer to about 100° C. for several minutes. A hot plate or oven is the preferred heating device. The progress of the solvent's evaporation can be monitored visually by the appearance and outward radial movement of interference fringes.

The wafer is then heated to a temperature of about 200° to 400° C. for a time of anywhere from approximately five minutes to several hours to imidize the film. It is preferable to perform this step in either a vacuum or an inert environment such as nitrogen or argon. Imidization done in an oxygen atmosphere will not interfere with the imidization process, but may result in a film surface which is darkened and oxidized.

The thickness of the film can be measured after the imidization step by any interferometric, prism coupling, or stylus profiler method.

The preparation of the polyimide film is now complete, and the next step involves releasing the film from the wafer. A frame is adhered to the film while the film is still attached to the wafer. Virtually any type or shape of frame will suffice; however, it is convenient to use frames made by slicing sections of extruded metal or plastic tubing. An example of such a frame is shown in FIG. 1. The structure of the frame should be such that it has an edge on each of two opposite sides of any central portion. FIG. 1 shows two edges 21 and 22 (the two ends, for example, of a sliced section of a tube), which are on opposite sides of a central portion (the central portion being the body of the tube whose outside surface is labelled 20 in FIG. 1). It is important that edge 21 of the frame in FIG. 1 is capable of resting perfectly flat on any smooth surface; in other words, the entire area of edge 21 should be in contact with any surface on which the frame might rest. Uneven cutting of the extruded tube will produce frames that "wobble," or rest unevenly on a flat surface. The cutting process may also create defects, such as burrs, that can contribute to the unevenness of edge 21. A convenient method for preparing edge 21 involves orientating the frame so that the edge 21 is in contact with a piece of emory paper on a flat surface, and sanding the entire area of edge 21 at one time with circular motions of the frame relative to the sandpaper.

Figure 2:
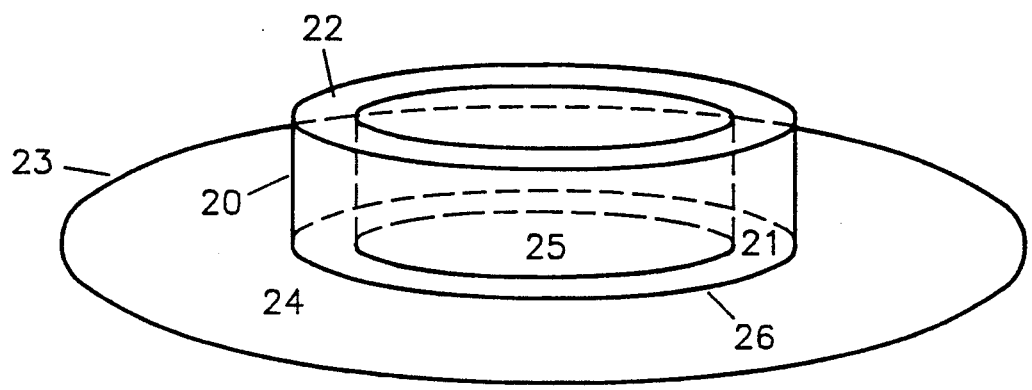
FIG. 2 depicts a "release frame" adhered to a polyimide film while the film is still attached to a silicon wafer (or any other suitable substrate).
Figure 3:
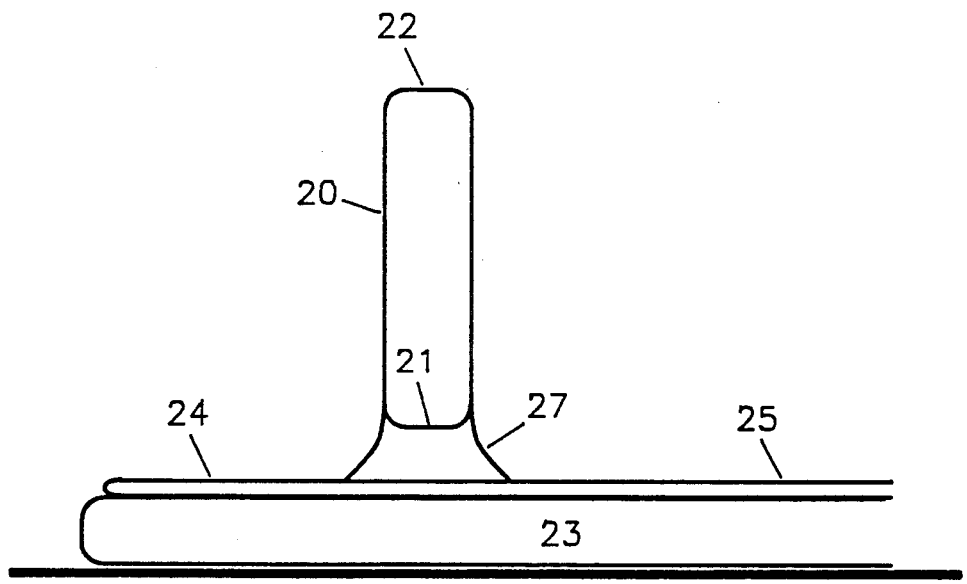
FIG. 3 gives a cross section through part of a film, frame, and wafer assembly after the frame has been adhered to the film while the film is still attached to the wafer.

The frame is cleaned of all particulate contamination by wiping it with a clean cloth soaked in isopropyl alcohol (IPA). Adhesive 27 is then applied evenly to edge 21. Two part, heat curing epoxies are examples of appropriate adhesives. The frame is then oriented so that edge 21 points toward wafer 23, and the frame is placed gently on the polyimide film as shown in FIG. 2. The entire surface area of edge 21 (see FIG. 2 and FIG. 3) should be put into contact with the polyimide film. Complete surface contact is necessary for two reasons: 1) the frame itself is used to peel the film off the substrate, and 2) complete contact prevents a liquid bath used in a subsequent immersion step (see below) from contaminating region 25 of the polyimide film (region 25 of the film is that which is situated within the frame). A cross section through part of the film, frame, and wafer assembly is shown in FIG. 3, but the size of the adhesive portion has been greatly exaggerated in this figure.

Adhesive 27 is then cured at about 50° C. by placing the assembly on a hot plate or in an oven. It is advisable to have wafer 23 previously positioned on the hot plate or in the oven before setting the frame on the wafer. This minimizes the movement and handling of the wafer and therefore prevents the possibility of the frame sliding relative to the wafer, smearing the uncured adhesive on the polyimide film. The wafer is left undisturbed for about 10 to 20 minutes, or until the adhesive is fully cured.

Figure 4:
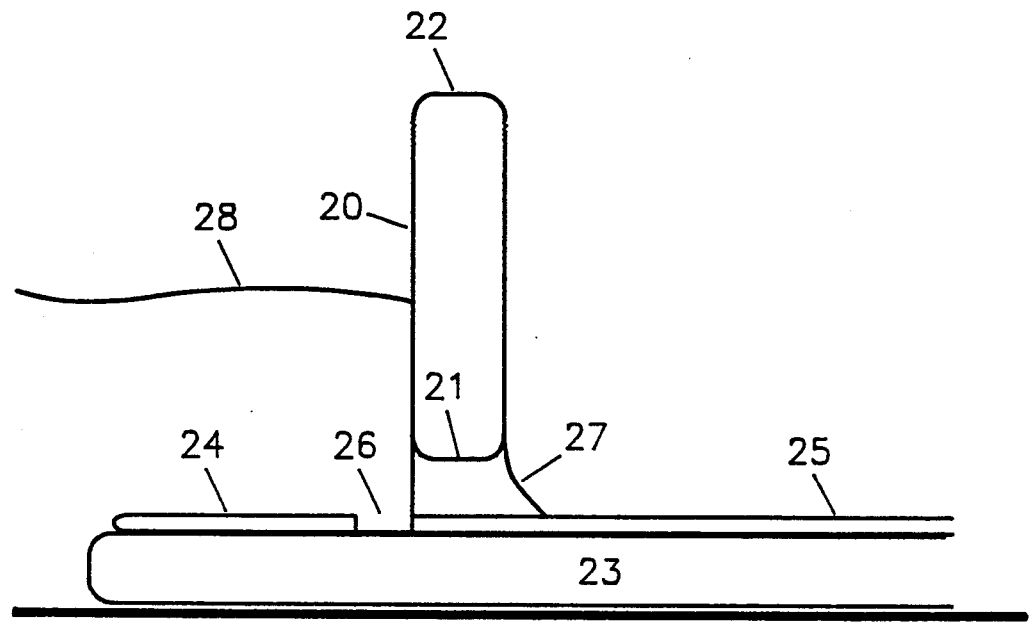
FIG. 4 shows the same cross section as in FIG. 3, but after a cutting tool has been used to score around an outside edge of a frame, and after a film, frame, and wafer assembly has been immersed in a liquid bath (in practice, the cutting step may be performed either prior to, during, or after an immersion step).

After the adhesive has cured, it is preferable to use an appropriate (thin and sharp) cutting tool to score around edge 26 of the frame, as shown in FIG. 4. The cutting step may be performed either prior to, during, or after the immersion step to be described in the following two paragraphs. FIG. 4 shows the cutting step having been performed either prior to or during the immersion step. The purpose of the cutting step is to sever the film so that when the frame is detached from the wafer, peeling region 25 of the polyimide film off with the frame, region 24 of the polyimide film does not release as well.

The entire film, frame, and wafer assembly is then immersed in a heated liquid bath. Perferably, the liquid bath should be composed predominantly of water, but can also contain small amounts of alcohol or other inert, non-reactive organic molecules (the purpose of the alcohol is to prevent water-spotting of the film). Most importantly, the liquid bath is free of reactive chemical agents. The liquid bath should, preferably, be heated to a temperature within the range 30° to 100° C. The actual temperature of the bath is not critical, provided a sufficient time of exposure is provided for that particular temperature. The temperature of the bath and the necessary time of exposure are inversely related (the warmer the bath, the less time required).

Liquid surface 28 should extend about halfway up surface 20 of the frame, as shown in FIG. 4, and should not be allowed to flow over edge 22 into the interior region of the frame. While this would not interfere with the release process, contact of the liquid with region 25 of the polyimide film would afford an opportunity for contamination of the film. When this occurs, water-spotting of region 25 of the polyimide film is not uncommon. Likewise, it is preferable to prevent the condensation of water onto region 25 of the polyimide film during exposure to the liquid bath.

Figure 5:
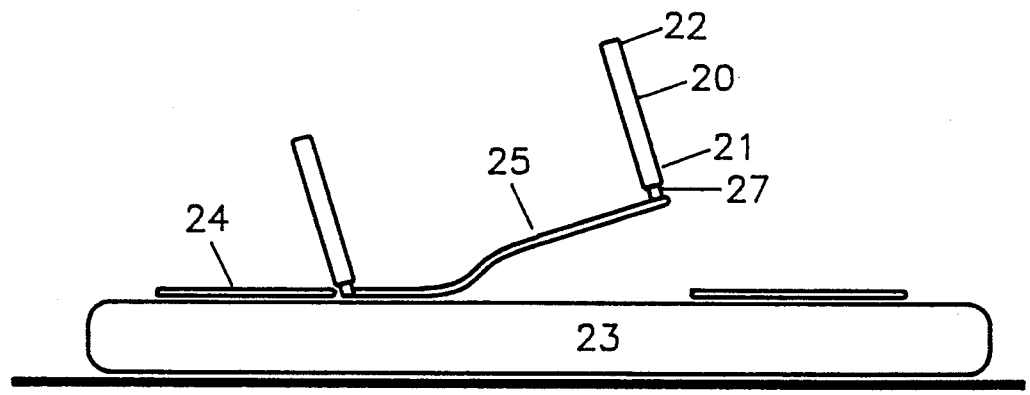
FIG. 5 illustrates a frame as it is being detached from a wafer (a pivoting step that peels a polyimide film off a wafer is being shown).
Figure 6:
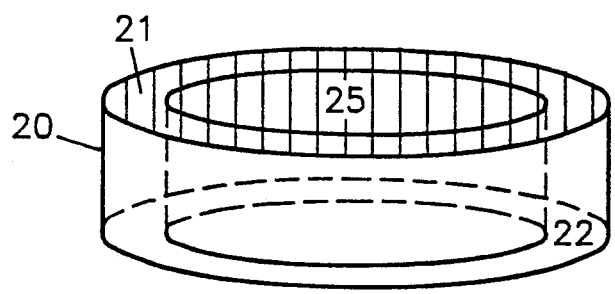
FIG. 6 shows the frame depicted in FIG. 1, but in this case supporting a free-standing polyimide film.

After immersion in the liquid bath for several hours, the assembly is removed from the bath, and wafer 23 and region 24 of the film are dried with a clean cloth. The frame can then be detached from the wafer, peeling region 25 of the polyimide film off with the frame as shown in FIG. 5. It is preferable to first lift only one side of the frame, pivoting on the edge 180 degrees opposite, as opposed to lifting all sides of the frame simultaneously. This ensures that the film will peel off the wafer in stages, minimizing damage to the film. The pivoting procedure is illustrated in FIG. 5; the figure depicts the stage at which the release is roughly 75% complete. There is often a small portion of film (less than about one percent of the total film area) that is the last to release. At best this region is marked with a tiny water-spot, and in the worst case, a tear can result in a tiny pinhole. By peeling the film off in the preferred pivoting manner, that defect can be positioned towards the perimeter of the film and avoided if the film is transferred to a smaller frame. After the release, the frame is then inverted to its original orientation as shown in FIG. 6. Free-standing polyimide film 25 is now attached to edge 21 of the release frame.

It is sometimes convenient to transfer the film from the release frame to a final application frame, where "final" in this context refers to the frame on which the film might be mounted for its field application. The transfer is necessary if the process would have been difficult using the final frame itself for the release. A final frame is inconvenient to use as a release frame if it has a small height, whereby the height of the frame is defined to be the distance between edge 21 and edge 22 in FIG. 4. A frame with a small height is difficult to grasp, and may allow the liquid to flow over edge 22 during the release process. Secondly, transferring the film to a smaller, final frame is a convenient way of avoiding any defects that appeared in the film during the release process.

Figure 7:
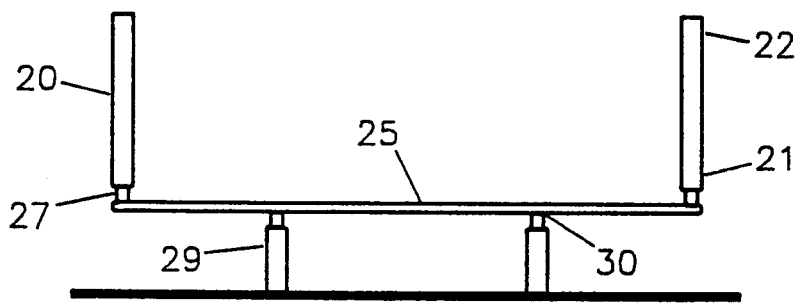
FIG. 7 depicts the procedure for transferring a free-standing polyimide film from a release frame to a final, field application frame.

The process of transferring the film to a smaller, final frame is shown in FIG. 7, and may be accomplished simply by applying an adhesive evenly to one edge of final frame 29, and positioning the polyimide film to come into contact with, and rest on, frame 29. It is preferable to have the outer diameter of frame 29 smaller than the inner diameter of release frame 20 from which the film is being transferred; in this manner, defects in the polyimide film at a radius larger than that of frame 29 in FIG. 7 may be avoided. The film is the cut around outside edge 30 of final frame 29 with an appropriate cutting tool. During this transfer step the orientation of release frame 20 relative to final frame 29 may also be situated 180 degrees opposite to that shown in FIG. 7, such that both frames "point down" relative to the film (just as final frame 29 points down relative to film 25 in FIG. 7).

Figure 8:
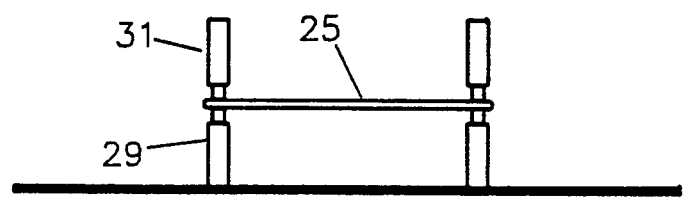
FIG. 8 illustrates the procedure for "sandwiching" a free-standing polyimide film between two frames.

The film may also be "sandwiched" between two frames, as shown in FIG. 8. A film mounted on a single frame, such as that in FIG. 6, must rest on edge 22; otherwise, edge 21 would be in contact with the resting surface and the polyimide film would be damaged. A second frame 31, however, can be adhered to the film such that the film is sandwiched between frames 29 and 31. The double frame assembly is particularly useful if both sides of the polyimide film are to be metallized. The assembly can be easily inverted in a deposition chamber for metallization of the second side.

EXAMPLE 1

A 1:1 ratio by weight of polyimide isoindoloquinazolinedione (PIQ 13; Hitachi Chemical) to N-methyl-2-pyrrolidone (Hunt Chemical) was mixed in a glass bottle containing a magnetic stir bar using a magnetic stir plate. The resin, or solids content of the Hitachi PIQ 13 was about 14 percent. Five milliliters of that solution was dispensed onto a 125 mm silicon wafer using a 30 ml syringe with a 0.5 micron Millipore (TM) filter attached to its tip in class 100 clean room conditions. A film was cast on a spincoater according to the regime: 1) spread cycle: 10 seconds at at 500 revolutions per minute (rpm), and 2) spin cycle: 20 seconds at 3,340 rpm. This combination of spin speed and solution viscosity yielded a film thickness of 3,000 Å. Spin speeds of 2,000, 3,000, and 5,000 rpm corresponded to film thicknesses of 4,750, 3,375, and 2,060 Å respectively. A spin speed of 400 rpm produced a film thickness of two microns.

The solvent was removed from the film by soft-baking the wafer in an oven at a temperature of about 100° C. for approximately one minute, and then subsequently heating it to a temperature of about 300° C. in a vacuum oven at a pressure of approximately −30 in. Hg for the imidization process. The film's thickness, as determined by interferometric methods, varied by no more than ±30 Å.

A release frame was made by slicing a 3 cm length from a piece of 8 cm diameter aluminium tubing. The film was released in the following manner. The frame was epoxied to the polyimide film on the silicon wafer. A 9:1 ratio by weight of the A to B parts (2.0 grams resin to 0.2 grams amine hardener) Epo-Tek 330 epoxy was mixed and applied evenly around one edge of the frame. The frame was then placed on the wafer such that the epoxy and polyimide film were in contact. The wafer was positioned on a hot plate, and the epoxy was cured at a temperature of about 50° C. for approximately 20 minutes.

The film was peeled from the wafer using the procedure outlined in the "description of the invention" section of this specification.

EXAMPLE 2

A weight ratio of 25 percent Hitachi Chemical PIQ 13 to 75 percent NMP was mixed and spincoated using a procedure similar to that of Example 1, except that rotational speeds of 1,000, 2,000, 3,000, 4,000, 5,000 and 6,000 rpm corresponded to film thicknesses of 1,551, 812, 566, 418, 344, and 320 Å respectively.

EXAMPLE 3

The free-standing polyimide film of Example 1 was metallized by the following procedure. The film was baked in a vacuum oven at a temperature of 40° C. and a pressure of −30 in. Hg to drive off residual water from the release process, and to remove any volatile, unreacted components. The film was inserted into a DC magnetron sputtering chamber and approximately 500 Å of aluminium was deposited onto each of the two sides of the polyimide film. The power to the sputtering targets was minimized, and the pressure and substrate-to-target distance maximized, to prevent overheating and outgassing of the polyimide layer. Removal of water from the sample was particularly important due to aluminium's propensity to oxidize. Once the sample had been removed from the vacuum chamber, the fabrication of the metal-polyimide composite was complete. The composite film was examined for pinholes using a backlit optical microscope at 400 times magnification. No pinholes were observed.

EXAMPLE 4

The procedure of Example 3 was repeated with the metals titanium, indium, and tin.

EXAMPLE 5

The method of Example 1 was repeated using the polyimides Ciba Geigy Probimide 400, DuPont PI-2611D, and Hitachi LQ 200.

I claim:

1. A method of fabricating a free standing polyimide film having a thickness of about five microns or less consisting essentially of the steps of:
    (a) spincoating a polyamic acid solution comprising a solvent and a polyamic acid onto a substrate that is free of parting agents and release agents and subsequently evaporating said solvent from said solution and imidizing said polyamic acid, thereby forming a polyimide film having a surface,
    (b) adhering a frame to said polyimide film so as to provide an adhered polyimide film wherein said frame has an edge on each of two opposite sides of a central portion of said frame located intermediate to said edges, such that the entire surface area of one of said edges of said frame is in contact with said surface of said polyimide film, and so that an interior portion of said polyimide film is located within said frame, said frame also having an outside surface,
    (c) scoring said polyimide film around said outside surface of said frame immediately adjacent to said adhered polyimide film with a cutting tool,
    (d) immersing said substrate, said polyimide film, and said frame assembly in a liquid bath composed predominantly of water, and which is free of reactive chemical agents, such that said liquid bath is prevented from flowing over the edge of said frame not in contact with said surface of said polyimide film and thereby contacting said interior portion of said polyimide film, and
    (e) detaching said frame from said substrate by first lifting only one side of said frame and then pivoting said frame on an opposite side, causing said polyimide film to be released from said substrate while supported by, and mounted to, said frame.

2. The method of claim 1 wherein a spincoating solution is dispensed using a syringe with a microfilter attached to its tip.

3. The method of claim 1 further including heating said liquid bath to a temperature within the range 30 to 100 degrees celsius.

4. The method of claim 1 wherein after said detaching of said frame from said substrate, said polyimide film is transferred to a smaller, final frame having an outside surface by applying an adhesive evenly to one edge of said final frame, positioning said polyimide film to come into contact with said adhesive, and then cutting said polyimide film around said outside surface of said final frame immediately adjacent to said polyimide film, whereby said transfer will:
    (a) mount said polyimide film onto a frame suitable for said film's field application,
    (b) render said detaching of said frame from said substrate more convenient by providing a release frame that has a greater height than that of said field application frame, and
    (c) avoid defects which may have been present in said polyimide film.

5. The method of claim 1 wherein after said detaching of said frame from said substrate, a second frame is adhered to said polyimide film such that said polyimide film is sandwiched between said frame and said second frame, whereby said film is sandwiched to:
  (a) protect said film from a resting surface onto which said film may be placed, and
  (b) provide a convenient assembly for metallizing both sides of said film.

6. The method of claim 1 further including depositing a metal film onto said polyimide film before said polyimide film is released from a substrate onto which it had been initially deposited.

7. The method of claim 1 further including depositing a metal film onto one side of a free standing polyimide film after said polyimide film has been released from a substrate onto which it had been initially deposited.

8. The method of claim 1 further including depositing a metal film onto both sides of a free standing polyimide film after said polyimide film has been released from a substrate onto which it had been initially deposited.

9. A method of fabricating a free standing polyimide film having a thickness of about five microns or less consisting essentially of the steps of:
  (a) spincoating a polyamic acid solution comprising a solvent and a polyamic acid onto a substrate that is free of parting agents and release agents and subsequently evaporating said solvent from said solution and imidizing said polyamic acid, thereby forming a polyimide film having a surface,
  (b) adhering a frame to said polyimide film so as to provide an adhered polyimide film wherein said frame has an edge on each of two opposite sides of a central portion of said frame located intermediate to said edges, such that the entire surface area of one of said edges of said frame is in contact with said surface of said polyimide film, and so that an interior portion of said polyimide film is located within said frame, said frame also having an outside surface,
  (c) immersing said substrate, said polyimide film, and said frame assembly in a liquid bath composed predominantly of water, and which is free of reactive chemical agents, such that said liquid bath is prevented from flowing over the edge of said frame not in contact with said surface of said polyimide film and thereby contacting said interior portion of said polyimide film,
  (d) then scoring said polyimide film around said outside surface of said frame immediately adjacent to said adhered polyimide film with a cutting tool, and
  (e) detaching said frame from said substrate by first lifting only one side of said frame and then pivoting said frame on an opposite side, causing said polyimide film to be released from said substrate while supported by, and mounted to, said frame.

10. The method of claim 9 wherein a spincoating solution is dispensed using a syringe with a microfilter attached to its tip.

11. The method of claim 9 further including heating said liquid bath to a temperature within the range 30 to 100 degrees celsius.

12. The method of claim 9 wherein after said detaching of said frame from said substrate, said polyimide film is transferred to a smaller, final frame having an outside surface by applying an adhesive evenly to one edge of said final frame, positioning said polyimide film to come into contact with said adhesive, and then cutting said polyimide film around said outside surface of said final frame immediately adjacent to said polyimide film, whereby said transfer will:
  (a) mount said polyimide film onto a frame suitable for said film's field application,
  (b) render said detaching of said frame from said substrate more convenient by providing a release frame that has a greater height than that of said field application frame, and
  (c) avoid defects which may have been present in said polyimide film.

13. The method of claim 9 wherein after said detaching of said frame from said substrate, a second frame is adhered to said polyimide film such that said polyimide film is sandwiched between said frame and said second frame, whereby said film is sandwiched to:
  (a) protect said film from a resting surface onto which said film may be placed, and
  (b) provide a convenient assembly for metallizing both sides of said film.

14. The method of claim 9 further including depositing a metal film onto said polyimide film before said polyimide film is released from a substrate onto which it had been initially deposited.

15. The method of claim 9 further including depositing a metal film onto one side of a free standing polyimide film after said polyimide film has been released from a substrate onto which it had been initially deposited.

16. The method of claim 9 further including depositing a metal film onto both sides of a free standing polyimide film after said polyimide film has been released from a substrate onto which it had been initially deposited.

17. A method of fabricating a free standing polyimide film having a thickness of about five microns or less comprising the steps of:
  (a) spincoating a polyamic acid solution comprising a solvent and a polyamic acid onto a substrate that is free of parting agents and release agents and subsequently evaporating said solvent from said solution and imidizing said polyamic acid, thereby forming a polyimide film having a surface,
  (b) adhering a frame to said polyimide film so as to provide an adhered polyimide film wherein said frame has an edge on each of two opposite sides of a central portion of said frame located intermediate to said edges, such that the entire surface area of one of said edges of said frame is in contact with said surface of said polyimide film, and so that an interior portion of said polyimide film is located within said frame, said frame also having an outside surface,
  (c) scoring said polyimide film around said outside surface of said frame immediately adjacent to said adhered polyimide film with a cutting tool,
  (d) immersing said substrate, said polyimide film, and said frame assembly in a liquid bath composed predominantly of water, such that said liquid bath is prevented from flowing over the edge of said frame not in contact with said surface of said polyimide film and thereby contacting said interior portion of said polyimide film,
  (e) detaching said frame from said substrate by first lifting only one side of said frame and then pivoting said frame on an opposite side, causing said polyimide film to be released from said substrate while supported by, and mounted to, said frame, and (f) ensuring that no step of said method involves exposure of said polyimide film to a reactive chemical solution.

18. The method of claim 17 wherein a spincoating solution is dispensed using a syringe with a microfilter attached to its tip, and further including heating said liquid bath to a temperature within the range 30 to 100 degrees celsius.

19. The method of claim 17 wherein after said detaching of said frame from said substrate, said polyimide film is transferred to a smaller, final frame having an outside surface by applying an adhesive evenly to one edge of said final frame, positioning said polyimide film to come into contact with said adhesive, and then cutting said polyimide film around said outside surface of said final frame immediately adjacent to said polyimide film, whereby said transfer will:

(a) mount said polyimide film onto a frame suitable for said film's field application,
(b) render said detaching of said frame from said substrate more convenient by providing a release frame that has a greater height than that of said field application frame, and
(c) avoid defects which may have been present in said polyimide film.

20. The method of claim 17 wherein after said detaching of said frame from said substrate, a second frame is adhered to said polyimide film such that said polyimide film is sandwiched between said frame and said second frame, whereby said film is sandwiched to:

(a) protect said film from resting surface onto which said film may be placed, and
(b) provide a convenient assembly for metallizing both sides of said film.

* * * * *